UNITED STATES PATENT OFFICE.

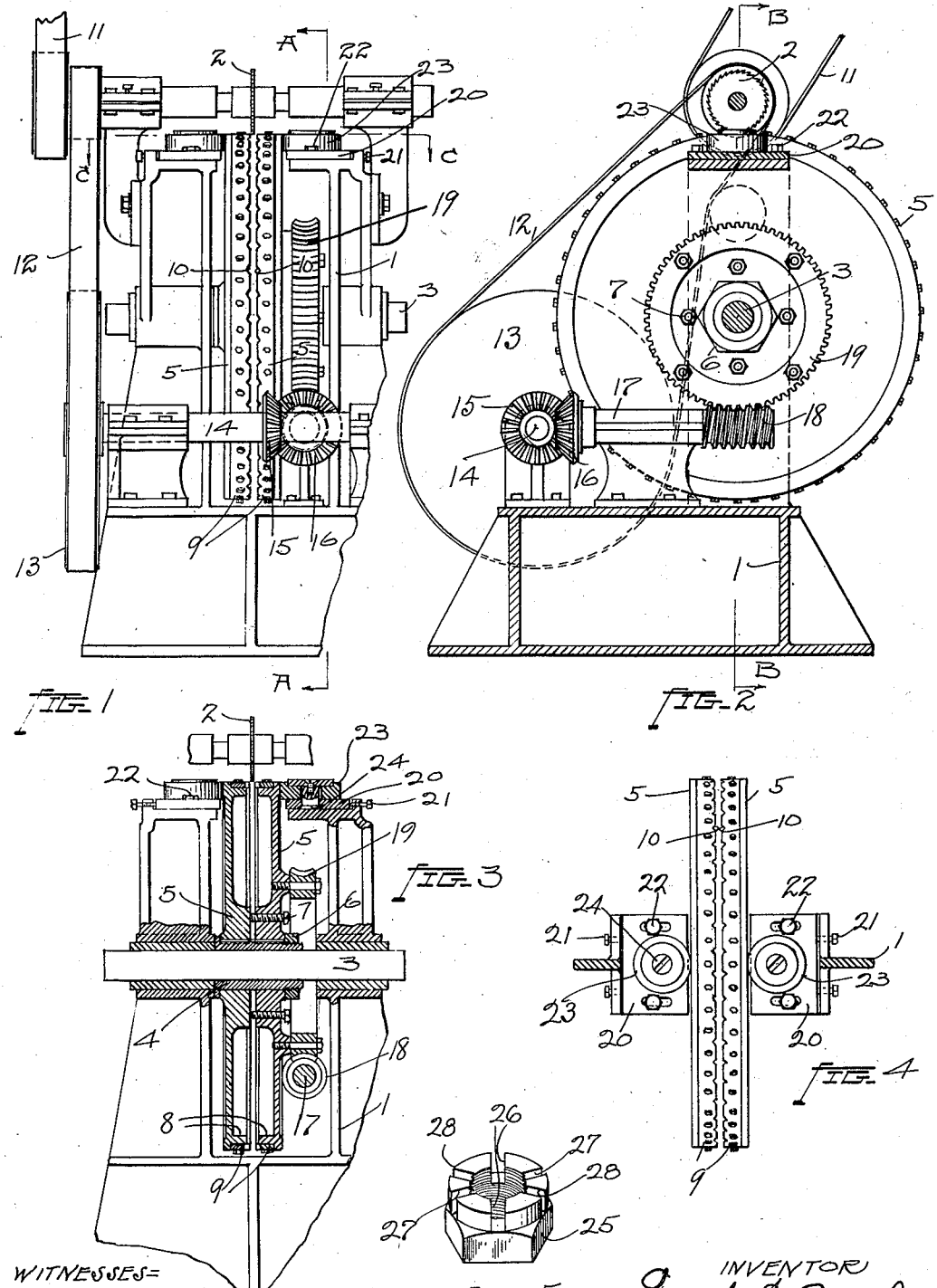

FRANK E. BRIGHTMAN, OF SANDUSKY, OHIO, ASSIGNOR TO THE BRIGHTMAN NUT & MANUFACTURING COMPANY, OF SANDUSKY, OHIO, A CORPORATION OF OHIO.

MACHINE FOR MAKING CASTELLATED NUTS.

1,092,126.  Specification of Letters Patent. Patented Mar. 31, 1914.

Application filed June 15, 1912. Serial No. 703,798.

*To all whom it may concern:*

Be it known that I, FRANK E. BRIGHTMAN, a citizen of the United States, and a resident of Sandusky, county of Erie, and State of Ohio, have invented a new and useful Improvement in Machines for Making Castellated Nuts, of which the following is a specification, the principle of the invention being herein explained and the best mode in which I have contemplated applying that principle, so as to distinguish it from other inventions.

The present invention has for its general object the provision of a machine capable of economically manufacturing castellated nuts, and the invention particularly provides for this and similar work a machine characterized by the utmost simplicity of construction and operation.

The annexed drawing and the following description set forth in detail certain mechanism embodying the invention, such disclosed means constituting, however, but one of various mechanical forms in which the principle of the invention may be used.

In said annexed drawing:—Figure 1 is a broken front elevation of a machine embodying the invention; Fig. 2 is a section on the line A—A in Fig. 1; Fig. 3 is a section on the line B—B in Fig. 2; Fig. 4 is a section on the line C—C in Fig. 1; and Fig. 5 is a perspective view of a nut produced by the machine.

The machine comprises a suitable frame 1 in which is rotatably mounted a cutter 2 which will have a form adapted to properly slot the nut to be operated upon. The preferred cutter is a rotary saw, and it will be understood that the saw will be so mounted in the frame 1 as to be removable or exchangeable at will.

The shaft 3 is mounted in the frame 1, and on the shaft is journaled a sleeve 4. Two disks 5 are keyed on the sleeve 4 and are secured against lateral displacement by a threaded collar 6, while set screws 7 afford a preferable means for adjusting the two disks at a greater or less distance from each other. The disks are provided with peripheral flanges 8, and secured thereto are rings 9 which are provided with a succession of complementary recesses 10 designed to receive a series of nuts to be operated upon.

Power is transmitted to the machine by a belt 11 which rotates the rotary saw 2, and power is transmitted from the intermediate shaft bearing the saw 2 to the shaft 3 by means of a belt 12, pulley 13, shaft 14 and bevel gear 15, bevel gear 16 and shaft 17 and worm 18, and worm gear 19 which is secured to one of the disks 5.

As will be noted from the drawing, the cutter 2 is disposed opposite the periphery of the conveyer formed by the two disks. Adjacent the cutter 2, two slides 20 are respectively mounted on opposite sides of the conveyer formed by the two disks, these slides being movable in a direction parallel to the shaft 3 and having set screws 21 and clamp bolts 22 for securing the slides in selected positions. Each of the slides carries an idling roller 23 riveted to it by a rivet 24.

In operation the conveyer formed by the two disks, and the rotary cutter, are both rotating and the two disks are definitely spaced apart, while the idling rollers are so set that the distance between them is less than the outside width of the conveyer. The two disks which form the conveyer have a very slight resiliency, so that they are capable of being slightly moved toward each other at their peripheries by the pressing action of the idling rollers. The operator places the nuts to be formed in the recesses formed in the periphery of the conveyer and the spacing of the disks is such that the complementary recesses will loosely receive the nuts, so that it is a simple matter for an operator to feed nuts to the machine. As the conveyer rotates the successive nuts are brought into engagement with the cutter; and during such engagement, and just before and after the engagement, the peripheries of the disks are pressed toward each other by the idling rollers so that the nuts are fixedly secured in the conveyer. During the engagement of the nut and the cutter the desired slot is formed in the nut, as for instance the slot 26 in the nut 25 shown in Fig. 5. The continued rotation of the conveyer quickly presents one nut after another to the cutter, and since the disks, after they pass the cutter, are no longer subject to the action of the idling rollers, the formed nuts are free to fall from the conveyer by gravity. The nuts may be formed with any number of slots by passing them through the machine a desired number of times, so that they may be formed, for instance, with slots 27 and 28 as in the nut 25 in Fig. 5, in addition to the slots 26.

The invention therefore provides a machine which is now obviously simple in construction. In operation the only manual attention it requires is the placing of nuts in the periphery of the conveyer at its ascending side, and the rotation of the conveyer causes the nuts to be securely fixed in position while they are being operated upon by the cutter to which they are conveyed, and to be subsequently discharged by gravity from the conveyer. The invention also provides for operating upon different forms and sizes of nuts by rendering the disks of the conveyer laterally adjustable and by providing for the corresponding adjustment of the idling rollers.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the class described, the combination of a rotatable conveyer, comprising two resilient disks fixed on a common axis, the disks being spaced apart at their peripheries and provided at their peripheries with a plurality of complementary recesses; a cutter disposed opposite the periphery of the conveyer; and means disposed adjacent the cutter for flexing the disks and thereby moving them toward each other at their peripheries.

2. In a machine of the class described, the combination of a rotatable conveyer, comprising two resilient disks fixed on a common axis, said disks being spaced apart at their peripheries and provided at their peripheries with a plurality of complementary recesses; a rotary saw disposed opposite the periphery of the conveyer; and two rolls disposed adjacent the saw and adapted to flex the disks and thereby move them toward each other at their peripheries.

3. In a machine of the class described, the combination of a rotary conveyer, comprising two resilient disks fixed on a common axis, said disks being spaced apart at their peripheries and provided at their peripheries with a plurality of complementary recesses; means for adjusting the disks axially relative to each other; a rotary saw disposed opposite the periphery of the conveyer; two slides disposed on opposite sides of the conveyer adjacent the cutter and movable parallel with the axis of the conveyer; means for securing the slides in selected position; and two rollers rotatably secured to the respective slides on axes transverse of the axis of the conveyer, the distance between the rollers being less than the normal width of the conveyer, whereby said rollers will flex the disks and move them toward each other at their peripheries.

Signed by me this 10th day of June, 1912.

FRANK E. BRIGHTMAN.

Attested by—
  GEO. M. ZIMMERMAN,
  WM. F. SENN.